United States Patent
Tajiri

[11] Patent Number: 5,936,206
[45] Date of Patent: Aug. 10, 1999

[54] WEIGHING MACHINES WITH MEANS FOR CORRECTING EFFECTS OF FLOOR VIBRATIONS ON WEIGHT SIGNALS THEREFROM

[75] Inventor: Shoko Tajiri, Shiga, Japan

[73] Assignee: Ishida Co., Ltd., Shiga-ken, Japan

[21] Appl. No.: 08/884,315

[22] Filed: Jun. 27, 1997

Related U.S. Application Data

[63] Continuation of application No. 08/294,470, Aug. 23, 1994, abandoned, which is a continuation-in-part of application No. 08/233,585, Apr. 26, 1994, abandoned, and application No. 08/236,760, Apr. 29, 1994, abandoned.

[30] Foreign Application Priority Data

Dec. 31, 1993 [JP] Japan ................................ 5-352700

[51] Int. Cl.[6] .................................................. G01G 3/00
[52] U.S. Cl. .................................. 177/25.13; 177/25.18; 177/50; 177/185
[58] Field of Search .......................... 177/1, 25.11, 25.12, 177/25.13, 25.14, 25.18, 50, 185; 364/571.01, 571.02, 571.03, 571.04, 571.05, 571.06, 571.07, 571.08, 572, 574, 567; 73/1.13, 1.15

[56] References Cited

U.S. PATENT DOCUMENTS

| | | | |
|---|---|---|---|
| 4,044,846 | 8/1977 | Matilainen | 177/165 |
| 4,102,421 | 7/1978 | Ozaki et al. | 177/185 |
| 4,294,321 | 10/1981 | Wittlinger et al. | 177/210 FP |
| 4,618,014 | 10/1986 | Kobayashi | 177/210 FP |
| 4,624,331 | 11/1986 | Naito | 177/185 |
| 4,694,920 | 9/1987 | Naito et al. | 177/25.18 |
| 4,705,126 | 11/1987 | Naito | 177/50 |
| 4,751,973 | 6/1988 | Freeman et al. | 177/185 X |
| 4,926,359 | 5/1990 | Konishi et al. | 177/185 X |
| 5,172,783 | 12/1992 | Feinland et al. | 177/185 |
| 5,220,970 | 6/1993 | Bachman | 177/185 X |

FOREIGN PATENT DOCUMENTS

| | | |
|---|---|---|
| 122796A1 | 4/1984 | European Pat. Off. . |
| 430695A2 | 11/1990 | European Pat. Off. . |
| 432979A2 | 12/1990 | European Pat. Off. . |

*Primary Examiner*—Randy W. Gibson
*Attorney, Agent, or Firm*—Majestic, Parsons, Siebert & Hsue P.C.

[57] ABSTRACT

A weighing machine, such as a combinational weighing machine, has scale cells and a plurality of vibration-detecting cells installed on the same floor. The scale cells output weight signals corresponding to the weights of objects being loaded. The mode of vibrations of the floor is detected from signals from the vibration-detecting cells. Vertical displacements of the floor at the positions of the scale cells are calculated therefrom, and their effects are removed from the weight signals. A control device is provided such that the effects of floor vibrations are ignored if they are sufficiently weak.

16 Claims, 8 Drawing Sheets

WEIGHING MACHINES WITH MEANS FOR CORRECTING EFFECTS OF FLOOR VIBRATIONS ON WEIGHT SIGNALS THEREFROM

This is a continuation of application Ser. No. 08/294,470 filed Aug. 23, 1994, to be abandoned, which is a continuation-in-part of both application Ser. No. 08/233,585 filed Apr. 26, 1994 and application Ser. No. 08/236,760 filed Apr. 29, 1994, both abandoned.

BACKGROUND OF THE INVENTION

This invention relates to weighing machines using load sensors such as load cells set on a floor to measure the weight of articles such as food items and industrial machine parts. More particularly, the invention relates to methods of and means for correcting the effects of lower-frequency floor vibrations on weight signals generated and processed by such a weighing machine.

Floor vibrations usually have lower frequencies than the vibrations caused by an object as it is placed on a weighing machine to be weighed. Thus, it may be thought that a filter can be used to eliminate such lower-frequency vibrations from the weight signals, but the cutoff frequency of the filter must be set low, and this makes the filtering time longer, adversely affecting the speed of weight measurements. U.S. Pat. No. 4,624,331 disclosed a weighing machine having not only a scale cell for measuring the weight of an object and outputting a weight signal indicative of the measured weight, but also a dummy cell set on the same floor as the scale cell such that the effects of the floor vibrations can be eliminated from the weight signal by inverting the dummy signal outputted from the dummy cell and adding it to the weight signal from the scale cell. In this manner, the cutoff frequency of the filter can be set higher, and hence the weighing speed is not reduced.

With a prior art weighing machine of this type, however, the scale cell and the dummy cell must be set close to each other because the floor at the positions of the two cells is assumed to be vibrating under the same conditions. If the conditions of vibrations are different at the positions of the cells, corrections cannot be effected accurately by subtracting the dummy signal of the dummy cell from the weight signal. There may even be situations where the error becomes magnified by the "correction". In short, the choice of the position for installing the dummy cell becomes extremely limited, and the degree of freedom in designing the weighing machine is reduced. If there is not much free space in the neighborhood of the scale cell, in particular, it is extremely difficult to find an adequate place for installing the dummy cell for this purpose. It now goes without saying that the difficulty of this kind is magnified in the case of a combinational weighing machine having a plurality of scale cells and calculating combinations of weight signals therefrom to select a particular combination satisfying a predetermined criterion because each of a large number (such as 10 or 14) of scale cells will have to be provided with a dummy cell associated therewith. Moreover, this has the adverse effects of making the machine large and complicated in structure.

Japanese Patent Publication Tokkai 64-32122 disclosed a combinational weighing machine adapted to determine the vibration characteristics of the floor from the average of weight signals outputted from those load sensors not selected in the preceding cycle of combinational calculations and to thereby correct the signals outputted from the selected load sensors. This correction routine is based, however, on the assumption that the floor vibrations are identical at the positions of the plurality of load sensors. If this assumption does not hold, the effects of floor vibrations cannot be eliminated accurately by subtracting such an average value.

Another problem with prior art methods using a scale cell in combination with another cell for detecting the floor vibrations relates to the difference in sensitivity between the two cells. In other words, signal levels from these two cells are usually different even if they are subjected to identical loads. This difference in sensitivity is due not only to the material, shape, size and fabrication conditions of the cells (or sensitivity difference characteristically of the cells) but also to the difference in the load. By prior art correction methods by subtracting the signal indicative of the floor vibrations from the weight signal, only the sensitivity difference characteristically of the cells (hereinafter referred to as the cell sensitivity) was corrected. This was in part because the weight of the target object, which is to be determined, is a part of the load on the scale cell and is basically an unknown. Since the load on the scale cell may be very different from the load on the vibration-detecting cell, however, prior art correction methods ignoring the sensitivity differences due to difference in load (hereinafter referred to as the weight sensitivity) cannot be accurate. Accuracy in measurements is believed to decline as the weight of the object being weighed increases.

Still another problem with prior art methods and means for correcting the effects of floor vibrations is that components of vibration-detecting signals are used constantly to carry out a specified vibration-correcting routine independently of whether the amplitude of floor vibrations is large or not. This is because certain kinds of errors, such as errors due to difference in sensitivity between the scale and dummy cells, quantization errors when analog-to-digital conversion is carried out and weighing errors due to rounding off, should be left uncorrected if the amplitude of floor vibration components is small. In other words, the final error in the weighing will often become larger by an attempt to make corrections if there are no floor vibrations or if the vibrations are so small as to be negligible.

It is therefore an object of the invention to provide a weighing machine capable of providing an accurate weight value independent of whether the amplitude of floor vibrations is large or small.

SUMMARY OF THE INVENTION

A weighing machine embodying the invention, with which the above and other objects can be accomplished, may be characterized as comprising one or more scale cells for measuring the weights of objects and outputting weight signals indicative of their weights, one or more vibration-detecting cells installed on the same floor as the scale cells for outputting a floor vibration signal indicative of the vibration of the floor, a correcting means for correcting the weight signals outputted from the scale cells on the basis of the floor vibration signals outputted from the vibration-detecting cells and thereby generating vibration corrected signals indicative of corrected weight values not containing effects of the vibrations, and correction control means for detecting vibration components of the floor and selectively deactivating or not deactivating operations of the correcting means, depending on the result of comparison between the floor vibration components and a predefined reference value.

The correction control means may include a filter which is connected to the scale cell or the vibration-detecting cell in parallel with the correcting means and receives the weight signal from the scale cell and vibration component detecting means for comparing the weight signal before and after passing through the filter and thereby detecting vibration components of the floor. The weighing machine further includes means for making a comparison between the vibration components and the given reference value during a preset time interval. The correcting means will be activated only if the component of the floor vibrations is greater than the reference value. It is deactivated if otherwise and the weight signal is outputted without being corrected.

A weighing machine according to this invention may further include first peak detecting means for detecting peaks in the weight signal from the scale cell and second peak detecting means for detecting peaks in the vibration-corrected signal outputted from the correcting means, the correction control means including peak comparing means for using a peak detected by the second peak detecting means as the reference value and comparing a peak detected by the first peak detecting means with this reference value. The correcting means is not activated if the value of the first peak is about the same as or less than that of the second peak serving as the reference value, and the weight signal is outputted without modification.

Alternatively, the correction control means may include zero-point adjusting means operating during a specified zero-point adjusting time interval for storing a zero-point level indicated by a zero-point signal obtained by removing the vibration component from the vibration-detecting signal and thereby outputting a zero-point signal indicative of the zero-point level. The amplitude of the floor vibration signal can be detected from the difference between the floor vibration signal and the zero-point signal. The correcting means is not activated if the amplitude thus determined is less than a reference value. Since the zero-point signal, which is compared with the vibration-detecting signal, is stabilized, the correcting means can be appropriately activated or deactivated. As a variation of the above, the zero-point level may be obtained by removing the vibration component from the weight signal from a scale cell in a no-load condition.

In all embodiments of the invention described above, if use is made of a plurality of vibration-detecting cells, vertical displacements of the floor at the positions of the scale cells can be more accurately calculated even if the scale and vibration cells are not disposed very close to each other and cannot be expected to vibrate in a similar manner. In other words, since the plurality of vibration-detecting cells do not have to be placed near the corresponding ones of the scale cells, the degree of design freedom is increased for the weighing machine as a whole even in situations where there is no free space in the immediate vicinity of the scale cells.

On the other hand, if the vibration-detecting and scale cells are placed sufficiently close to each other such that their modes of vibration may be considered identical, a simple subtracting means capable of subtracting the vibration component of the vibration-detecting signal from the weight signal may be sufficient to serve as the correcting means.

If the weighing machine is a combinational weighing machine with a plurality of scale cells, the machine will include a combination calculating means of a known kind for selecting a combination of weighed values according to a given criterion. Although the weighing machines of this invention were described above as having scale cells and vibration-detecting cells, a combinational weighing machine according to this invention may not include any cell which serves only to detect the floor vibration and not to weigh an object. Those of the scale cells of a combinational weighing machine not selected in the preceding combinational calculation may serve as detectors of the floor vibration mode, and they may be considered as vibration-detecting cells for the current cycle. In this manner, there is no need to look for any free space for installing dedicated vibration-detecting cells, and the weighing machine can be made compact as a whole.

BRIEF DESCRIPTION OF THE DRAWINGS

The accompanying drawings, which are incorporated in and form a part of this specification, illustrate several embodiments of the invention and, together with the description, serve to explain the principles of the invention. In the drawings.

Throughout herein, those components which are equivalent to one another, or at least substantially similar, are indicated by the same numerals, and their descriptions are not necessarily repeated each time they appear on a different drawing.

DETAILED DESCRIPTION OF THE INVENTION

Figure 1:
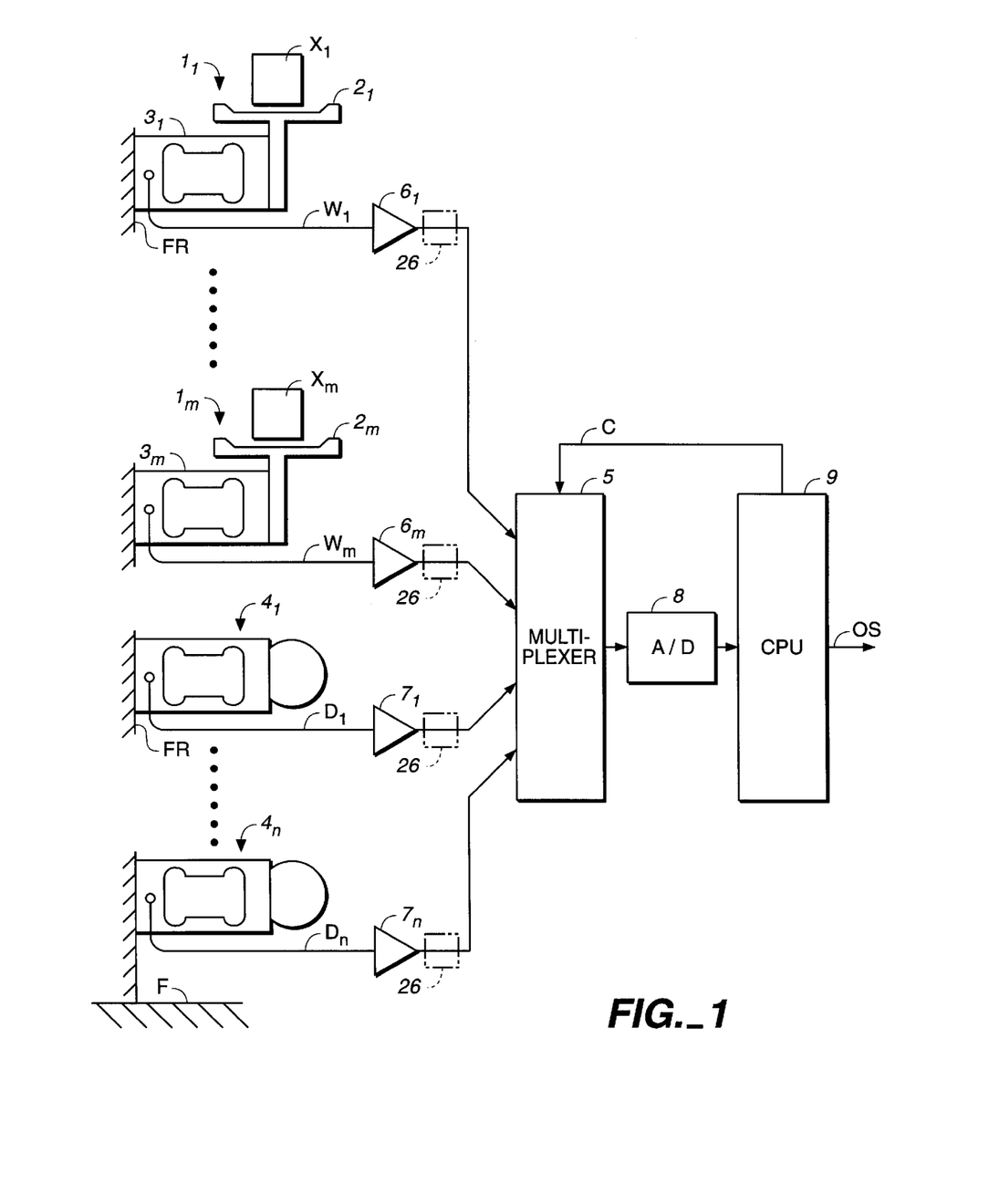
FIG. 1 is a block diagram of a signal processing system embodying the invention for a combinational weighing machine.

In what follows, the invention is described more in detail by way of some specific examples. With reference first to FIG. 1 which represents a signal processing system according to an embodiment of the invention for a combinational weighing machine (say, of a type described in U.S. patent application Ser. No. 08/233,585 incorporated herein by reference), there are a plural m-number of load sensors $1_1$–$1_m$ each comprising a weigh hopper $2_1$–$2_m$ and a scale cell $3_1$–$3_m$ such that objects $X_1$–$X_m$ placed in the weigh hoppers $2_1$–$2_m$ are weighed respectively by the corresponding ones of the scale cells $3_1$–$3_m$ and analog weight signals $W_1$–$W_m$ representing their weights are outputted. There are also a plural n-number of vibration-detecting cells $4_1$–$4_n$ installed through frames FR on the same floor F as the scale cells $3_1$–$3_m$, being adapted to output analog vibration-detecting signals $D_1$–$D_n$ caused by the floor vibrations. The vibration-detecting cells $4_1$–$4_n$ may be installed either on the frame of the weighing machine or on other prepared frames having the same vibration mode as the frame of the weighing machine.

The analog weight signals $W_1$–$W_m$ outputted from the load sensors $1_1$–$1_m$ are amplified by amplifiers $6_1$–$6_m$ and inputted into a multiplexer 5. The vibration-detecting signals $D_1$–$D_n$ from the vibration-detecting cells $4_1$–$4_n$ are also amplified by amplifiers $7_1$–$7_n$ and inputted into the same multiplexer 5. The signals $W_1$–$W_m$ and $D_1$–$D_n$, selectively outputted from the multiplexer 5 in response to a switch signal C from a CPU 9, are converted into digital signals by an analog-to-digital (A/D) converter 8.

The CPU 9, which includes a combination calculating means (shown at 25 in FIG. 2), carries out vibration corrections and combinational calculations by using the digital weight and vibration-detecting signals $W_1-W_m$ and $D_1-D_n$ received through the A/D converter 8 and outputs open signals OS for selectively opening a combination of weigh hoppers $2_1-2_m$ which satisfies a preset criterion (such as having the total weight closest to a preset target weight value).

Figure 2:
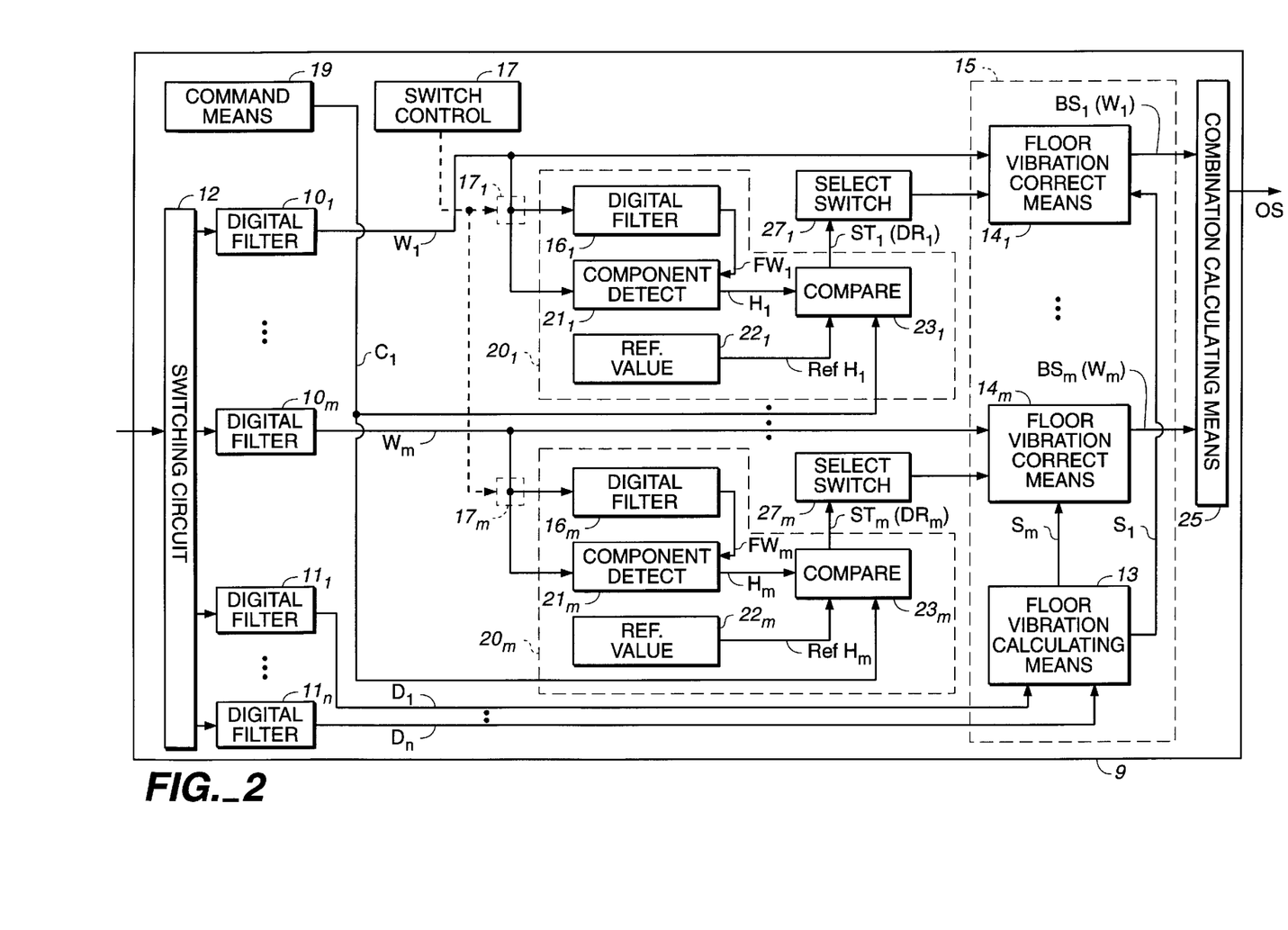
FIG. 2 is a block diagram of the CPU of FIG. 1.

With reference next to FIG. 2, the CPU 9 contains digital filters (of a first kind) $10_1-10_m$ and $11_1-11_n$. The weight and vibration-detecting signals $W_1-W_m$ and $D_1-D_n$, which are selectively outputted from the multiplexer 5 and converted into digital signals by the A/D converter 8, are passed through a switching circuit 12 and corresponding one of the digital filters $10_1-10_m$ and $11_1-11_n$ in such that their components with relatively high frequencies, generated principally when objects $X_1-X_m$ to be weighed are put inside the weigh hoppers $2_1-2_m$, are eliminated. If analog filters are to be used instead of, or in addition to, the digital filters shown at $10_1-10_m$ and $11_1-11_n$, such analog filters are connected at 26 in FIG. 1.

The CPU 9 also includes a floor vibration calculating means 13 for detecting the vibration mode of the floor from the vibration components of the digital vibration-detecting signals $D_1-D_n$ received through the filters $11_1-11_n$, calculating therefrom the vertical displacements of the floor at the positions of the scale cells $3_1-3_m$ and outputting displacement signals $S_1-S_m$ indicative of these calculated vertical displacements of the floor. These displacement signals $S_1-S_m$ are respectively received by floor vibration correcting means $14_1-14_m$ for respectively correcting the digital weight signals $W_1-W_m$ received respectively through the filters $10_1-10_m$. In other words, the effects of the vibrations represented by the displacement signals $S_1-S_m$ are subtracted from the measured weight values represented by the weight signals $W_1-W_m$ to generate and output vibration corrected weight signals $BS_1-BS_m$. Numeral 15 indicates a correction circuit which consists of the floor vibration calculating means 13 and the floor vibration correcting means $14_1-14_m$ and serves to make corrections on the weight signals $W_1-W_m$ by using the vibration components of the vibration-detecting signals $D_1-D_n$ outputted from the vibration-detecting cells $4_1-4_n$.

Numerals $16_1-16_m$ indicate a set of filters (of a second kind) characterized as having a relatively low cutoff frequency for eliminating the low-frequency vibration components of the floor, each connected in parallel to corresponding one of the floor vibration correcting means $14_1-14_m$ so as to receive the weight signals $W_1-W_m$ and output corrected weight signals $FW_1-FW_m$ with the vibration components of the floor removed.

Correction control means $20_1-20_m$, individually associated with the floor vibration correcting means $14_1-14_m$ include component detecting means $21_1-21_m$, reference value setting means $22_1-22_m$ and comparing means $23_1-23_m$ in addition to the aforementioned digital filters of the second kind $16_1-16_m$. The component detecting means $21_1-21_m$ serve to compare the digital weight signals $W_1-W_m$ before they are passed though the digital filters of the second kind $16_1-16_m$ and the corrected weight signals $FW_1FW_m$ after they have passed therethrough to thereby determine the vibration components of the floor. The reference value setting means $22_1-22_m$ are for setting and inputting reference values $RefH_1-RefH_m$ for the amplitudes of the vibration components of the floor. The comparing means $23_1-23_m$ are for comparing the amplitudes $H_1-H_m$ of the floor vibration components obtained by the component detecting means $21_1-21_m$ with the inputted reference values $RefH_1-RefH_m$. The comparing means $23_1-23_m$ are adapted to carry out the comparison operations only during a preset time interval in response to a command signal $C_1$ outputted from a command means 19.

The correction control means $20_1-20_m$ serve to deactivate and to thereby stop the operations of the floor vibration correcting means $14_1-14_m$ in response to stop signals $ST_1-ST_m$ outputted from the comparing means $23_1-23_m$ when $H_1 \leq RefH_1$, ... or $H_m \leq RefH_m$, and to operate the floor vibration correcting means $14_1-14_m$ in response to correction drive signals $DR_1-DR_m$ from the comparing means $23_1-23_m$ when the amplitudes $H_1-H_m$ are respectively greater than the reference values $RefH_1-RefH_m$. The operations of these component detecting means $21_1-21_m$ will be explained next with reference to one of them ($21_1$).

The command means 19 is adapted to output the command signal $C_1$ at a preset time when decision is to be made whether floor vibration correction must be carried out. Such time may be found before the beginning of the daily weighing operation. If the command signal $C_1$ is received, the associated comparing means $23_1$ is activated and outputs a stop signal $ST_1$ to the correction circuit 15 to deactivate to thereby stop the operation of the corresponding floor vibration correcting means $14_1$ if any, all or the average of the amplitudes $H_1$ detected during the specified time is less than the reference value $RefH_1$.

The CPU 9 is also provided with manually operated selection switches $27_1-27_m$ for selectably allowing or not allowing the stop and drive signals $ST_1-ST_m$ and $DR_1-DR_m$ from the comparing means $23_1-23_m$ of the correction control means $20_1-20_m$ to be transmitted to the floor vibration correcting means $14_1-14_m$ of the correction circuit 15. In other words, these selection switches $27_1-27_m$ allow the user to manually change the mode of control of the correction circuit 15 by the correction control means $20_1-20_m$, in response to the condition of the weighing operations or a change in environmental conditions. For example, the selection switches $27_1-27_m$ may be set in ON conditions to allow the stop and drive signals $ST_1-ST_m$ and $DR_1-DR_m$ to pass therethrough but, when it is known that a vibration-causing operation is going to take place, the user may manually set the selection switches $27_1-27_m$ in OFF conditions to disallow the signals $ST_1-ST_m$ and $DR_1-DR_m$ to pass therethrough and to stop the operations of the floor vibration correcting means $14_1-14_m$ such that the weight signals $W_1-W_m$ from the first digital filters $10_1-10_m$ are directly inputted unmodified to the combination calculating means 25 for carrying out combinational calculations. As another example, the user can cause the floor vibration correcting means $14_1-14_m$ to operate all the time independent of the magnitude of the floor vibrations also by preventing the signals $ST_1-ST_m$ and $DR_1-DR_m$ from passing through the selection switches $27_1-27_m$.

In summary, the weight signals $W_1-W_m$ outputted from the digital filters of the first kind $10_1-10_m$ are always inputted to the stronger digital filters (of the second kind) $16_1-16_m$ through switching means $17_1-17_m$ controlled by a switch control means 17, while both the weight signals $W_1-W_m$ before passing through the digital filters of the second kind $16_1-16_m$ and the corrected weight signals $FW_1-FW_m$ after passing them are inputted to the component detecting means $21_1-21_m$ such that the vibration components of the floor can be determined.

The comparing means $23_1-23_m$ of the correction control means are activated when the command signal $C_1$ is received from the command means 19, and the amplitudes $H_1-H_m$ of these vibration components obtained by the component detecting means $21_1-21_m$ are compared with the reference values $RefH_1-RefH_m$ set in the reference value setting means $22_1-22_m$ within a judging time period. If the minimums, maximums or averages of the amplitudes $H_1-H_m$ within the judging time period are respectively less than $RefH_1-RefH_m$, the stop signals $ST_1-ST_m$ outputted from the comparing means $23_1-23_m$ are inputted to the floor vibration correcting means $14_1-14_m$ of the correction circuit 15, and the operation of the correction circuit 15 is stopped. In other words, the digital weight signals $W_1-W_m$ are not corrected by the floor vibration correcting means $14_1-14_m$ but are directly inputted to the combination calculating means 25.

On the other hand, if the minimums, maximums or averages of the amplitudes $H_1-H_m$ within the judging time period are respectively greater than the reference values $RefH_1-RefH_m$ set in the reference value setting means $22_1-22_m$, the drive signals $DR_1-DR_m$ outputted from the comparing means $23_1-23_m$ are inputted to the floor vibration correcting means $14_1-14_m$ and the correction circuit 15 performs its functions.

If the operation of the correction circuit 15 is not stopped, the vibration-detecting signals $D_1-D_n$ outputted from the vibration-detecting cells $4_1-4_n$ set on the same floor F as the scale cells $3_1-3_m$ are inputted to the floor vibration calculating means 13 wherein the vibration mode of the floor is determined from the vibration components of the vibration-detecting signals $D_1-D_n$ and the vertical displacements of the floor F at the positions of the scale cells $3_1-3_m$ are calculated. The displacement signals $S_1-S_m$ indicative of these calculated vertical displacements of the floor are respectively received by the floor vibration correcting means $14_1-14_m$ and used thereby to correct the digital weight signals $W_1-W_m$ received respectively through the filters $10_1-10_m$, as explained above.

In summary, if the amplitudes of the floor vibration components are small, the weight signals $W_1-W_m$ are used directly so as to eliminate the possibility of inadvertently incurring a large error by attempting to correct errors due to difference in sensitivity between the scale cells $3_1-3_m$ and the vibration-detecting cells $4_1-4_n$, quantization errors when analog-to-digital conversion is carried out, and weighing errors due to rounding off. Since the correction operations are carried out digitally according to the illustrated example, more accurate corrections are possible than if they are done by using analog circuits among which there tend to be individual fluctuations.

In general, a method, such as the one described above, of detecting the vibration modes of a floor and canceling the vibration components of scale cells at arbitrary positions thereon is referred to as a multi-point AFV (anti-floor vibration) process. Next, this process will be explained briefly.

If scale cells are distributed two-dimensionally (say, on a horizontal plane), floor vibrations are detected by vibration-detecting cells at three or more positions on the plane not in collinear relationship, the vibration modes of the floor are detected from the vibrations detected thereby, and the vibration components of the floor at arbitrary positions of the scale cells are obtained therefrom and subtracted from the weight values being outputted from these scale cells. If the scale cells are distributed one-dimensionally (say, on a single horizontal line), floor vibrations are detected by vibration-detecting cells at two or more different positions on the line, and the vibration components of the floor at the arbitrary positions of the scale cells are similarly obtained and subtracted from the weight values being outputted therefrom.

Figures 3, 4:
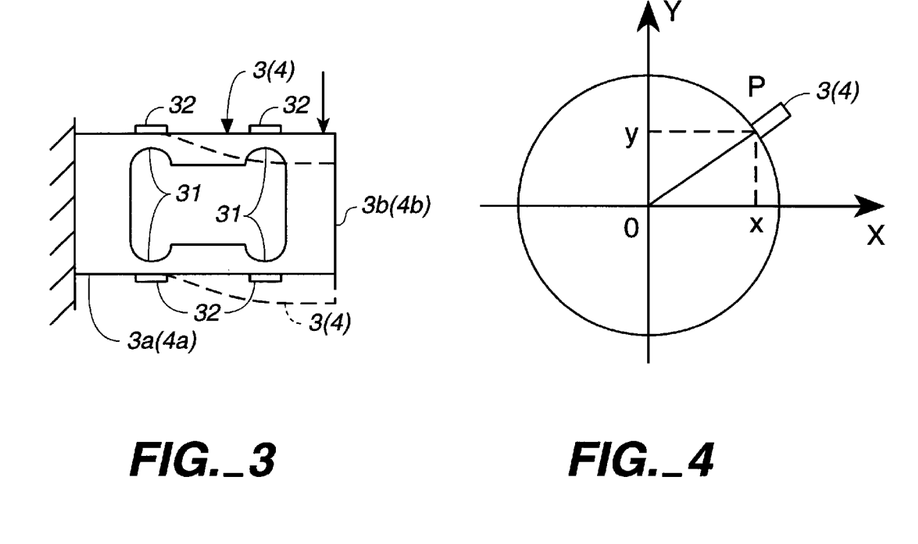
FIG. 3 shows the shape and deformation of a load cell for explaining the theory of AFV (anti-floor vibration) technology.
FIG. 4 shows the positioning of the load cell of FIG. 3.

FIG. 3 shows the structure of a load cell 3(4) used as the scale and vibration-detecting cells $3_1-3_m$ and $4_1-4_n$ in the weighing machine described above. A load cell 3(4) of this type is provided with four strain gauges 32 attached individually near one of four notches 31 formed in a central opening therethrough to detect its deformation in terms of the strains measured thereby. These four strain gauges 32 form a Wheatstone bridge (not shown) which is adapted such that its output changes only if the load cell 3(4) is deformed into a parallelogram as shown by a broken line. In other words, there is no change in its output if the load cell 3(4) undergoes any other kind of deformation. Thus, when there is a relative deformation between the fixed side 3a(4a) of the load cell 3(4) where it is attached to the floor and the free side 3b(4b) where a load is applied (indicated by an arrow), only the component of a parallelogrammic deformation is detected. When such load cells 3(4) are used in a combinational weighing machine as described above, therefore, only the perpendicular (vertical) components of the vibration modes of the floor need to be considered.

Consider, for example, a load cell 3(4) affixed at a position P(x, y) on an X-Y plane as shown in FIG. 4. The motion of the X-Y plane can be described in terms of the rotation around the X-axis, the rotation around the Y-axis and the motion along an axis (the Z-axis) perpendicular to both the X-axis and the Y-axis. The other modes of motion will not be discussed here because they are not detected by the load cell 3(4). Now, let the motion in the Z-direction caused by a rotary motion around the X-axis be denoted by B(t), that caused by a rotary motion around the Y-axis by A(t) and the motion in the direction of the Z-axis by C(t). Of the output signal from the load cell at position P, the component $V_p(t)$ contributed by the floor vibration is given as follows:

$$V_p(t)=xA(t)+yB(t)+C(t) \quad (1)$$

In order to obtain the values of A(t), B(t) and C(t), it is theoretically sufficient to detect the floor motion at three positions not in a collinear relationship and solve linear simultaneous equations with three unknowns. In practice, however, motion is detected at more than three positions because the output from each load sensor contains some measurement errors, and A(t), B(t) and C(t) are obtained preferably by a method of least squares. It is the floor vibration calculating means 13 that calculates the values of $V_p(t)$ from A(t), B(t) and C(t) by using (1).

Although the multi-point AFV process was illustrated above for a combinational weighing machine having scale and vibration-detecting cells $3_1-3_m$ and $4_1-4_n$ separately set on the same floor, it is not necessary that separate vibration-detecting cells should be used. Instead, weight signals from those of the scale cells which were not selected in the preceding combinational calculation can be used as vibration-detecting signals to detect the vibration mode of the floor from the vibration components of these vibration-detecting signals. This method is advantageous in that vibration-detecting cells do not have to be specially set and hence the machine can be made simpler in structure and compact as a whole.

Figure 5:
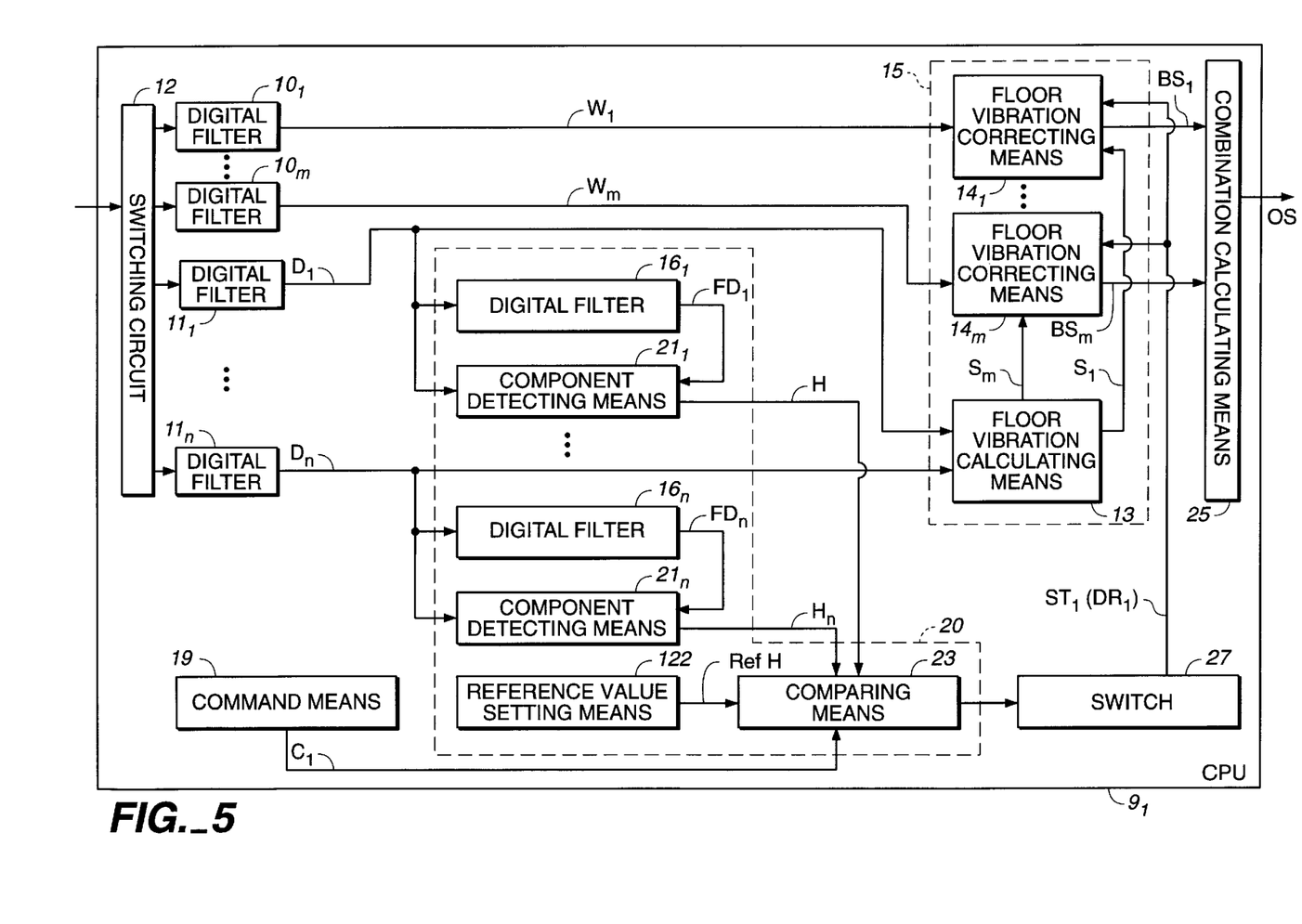
FIGS. 5–9 are block diagrams of other CPUs according to the invention which may be used in place of the CPU shown in FIG. 2.

FIG. 5 shows the structure of another CPU $9_1$ which may be substituted for the CPU 9 shown in FIG. 2, being different therefrom in the following two aspects. Firstly, a single correction control means 20 (instead of the plurality of correction control means $20_1$–$20_m$ of FIG. 2) is connected to the output side of the digital filters $11_1$–$11_n$ in and compares the digital vibration-detecting signals $D_1$–$D_n$ therefrom with corrected vibration-detecting signals $FD_1$–$FD_n$ after they have passed n-number of digital filters of the second kind $16_1$–$16_n$ to thereby determine the vibration components of the floor. Secondly, this single correction control means 20 is provided not only with the stronger digital filters (of the second kind) $16_1$–$16_n$ but also with n-number of component detecting means $2_1$–$21_n$ and a single comparing means 23. This comparing means 23 is activated for a specified judging time period and thereby compares the minimum or maximum of the amplitudes $H_1$–$H_n$ of the vibration components of the floor determined by the component detecting means $21_1$–$21_n$ with a single reference value RefH set inside a reference value setting means 22, outputting a stop signal ST1 or a drive signal DR1 accordingly, as explained above with reference to FIG. 2. In other respects, the CPU $9_1$ shown in FIG. 5 is identical to the CPU 9 in FIG. 2, and those components which are identical or equivalent to each other are indicated by the same numerals. It goes without saying that the CPU $9_1$ of FIG. 5 may also be provided with a command means as indicated at 19 in FIG. 2 such that the judging time period for activating the single comparing means 23 can be controlled by a command signal.

With the CPU $9_1$ thus structured, too, the uncorrected weight signals $W_1$–$W_m$ are used directly if the floor vibrations are relatively small so as to eliminate the possibility of incurring a large error by attempting to correct errors due to difference in sensitivity between the scale cells $3_1$–$3_m$ and the vibration-detecting cells $4_1$–$4_n$, quantization errors when analog-to-digital conversion is carried out, and weighing errors due to rounding off.

Figure 6:
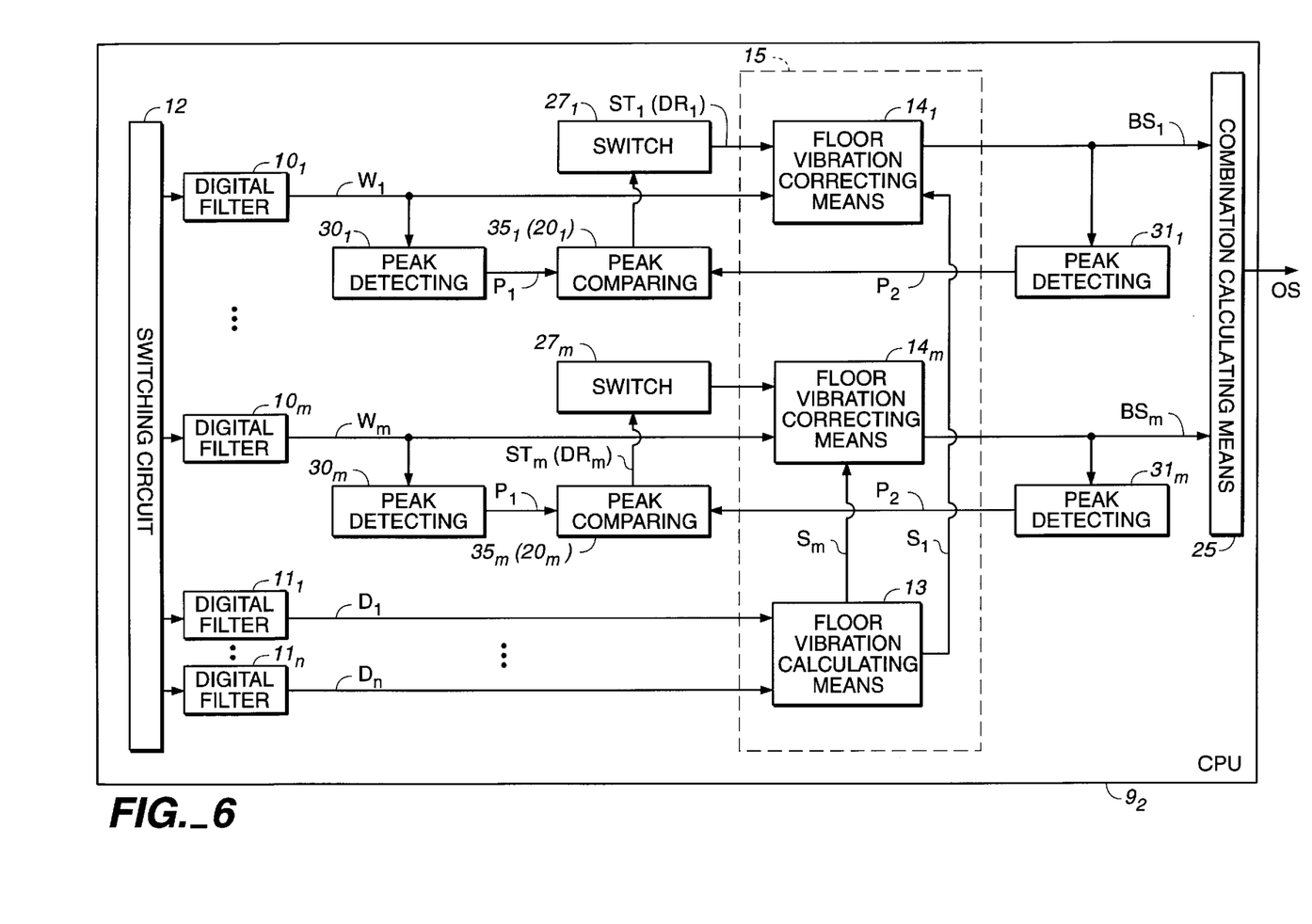

FIG. 6 shows still another CPU $9_2$ which may be viewed as another variation of the CPU 9 shown in FIG. 2, characterized as including peak detecting means of a first kind $30_1$–$30_m$ for detecting peak values $P_1$ of the digital weight signals $W_1$–$W_m$ outputted from the scale cells $3_1$–$3_m$ (and passed through the digital filters $10_1$–$10_m$) and peak detecting means of a second kind $31_1$$31_m$ for detecting (second) peak values $P_2$ of the vibration corrected weight signals $BS_1$–$BS_m$ outputted from the floor vibration correcting means $14_1$–$14_m$ of the correction circuit 15. There are also included peak value comparing means $35_1$–$35_m$ for using these second peak values $P_2$ as a reference value and comparing the first peak values $P_1$ therewith. Neither the digital filters of the second kind $16_1$–$16_n$ nor the command means 19 shown in FIG. 2 find their equivalents in the CPU $9_2$, although a command means may be included such that the peak value comparing means $35_1$–$35_m$ may be activated only during a specified judging time period. The peak value comparing means $35_1$–$35_m$ may be programmed to output a stop signal ST1 to the correction circuit 15 to stop the operations of the corresponding floor vibration correcting means $14_1$–$14_m$ if any of the (first) peak values $P_1$ detected during a predetermined time interval is less than the corresponding reference peak value $P_2$ ("minimum" condition), if all of such first peak values $P_1$ are less than the corresponding reference value $P_2$ ("maximum" condition), or if the average of them is less than the corresponding reference value $P_2$. The advantage of this CPU $9_2$ is that the operation of any of the floor vibration correcting means $14_1$–$14_m$ is stopped if its corresponding first peak value $P_1$ is less (whether in the sense of "minimum", "maximum" or average as explained above) than a predetermined reference value (represented by the second peak value $P_2$) so as to reduce the errors which may be generated due to vibration corrections. In other respects, FIG. 6 is identical to FIG. 2 and those components which are identical or equivalent to each other are indicated by the same numerals. With the CPU $9_2$ thus structured, the weight signals $W_1$–$W_m$ are not modified if the value of the first peak is about the same as or less than that of the second peak serving as the reference value.

Figure 7:
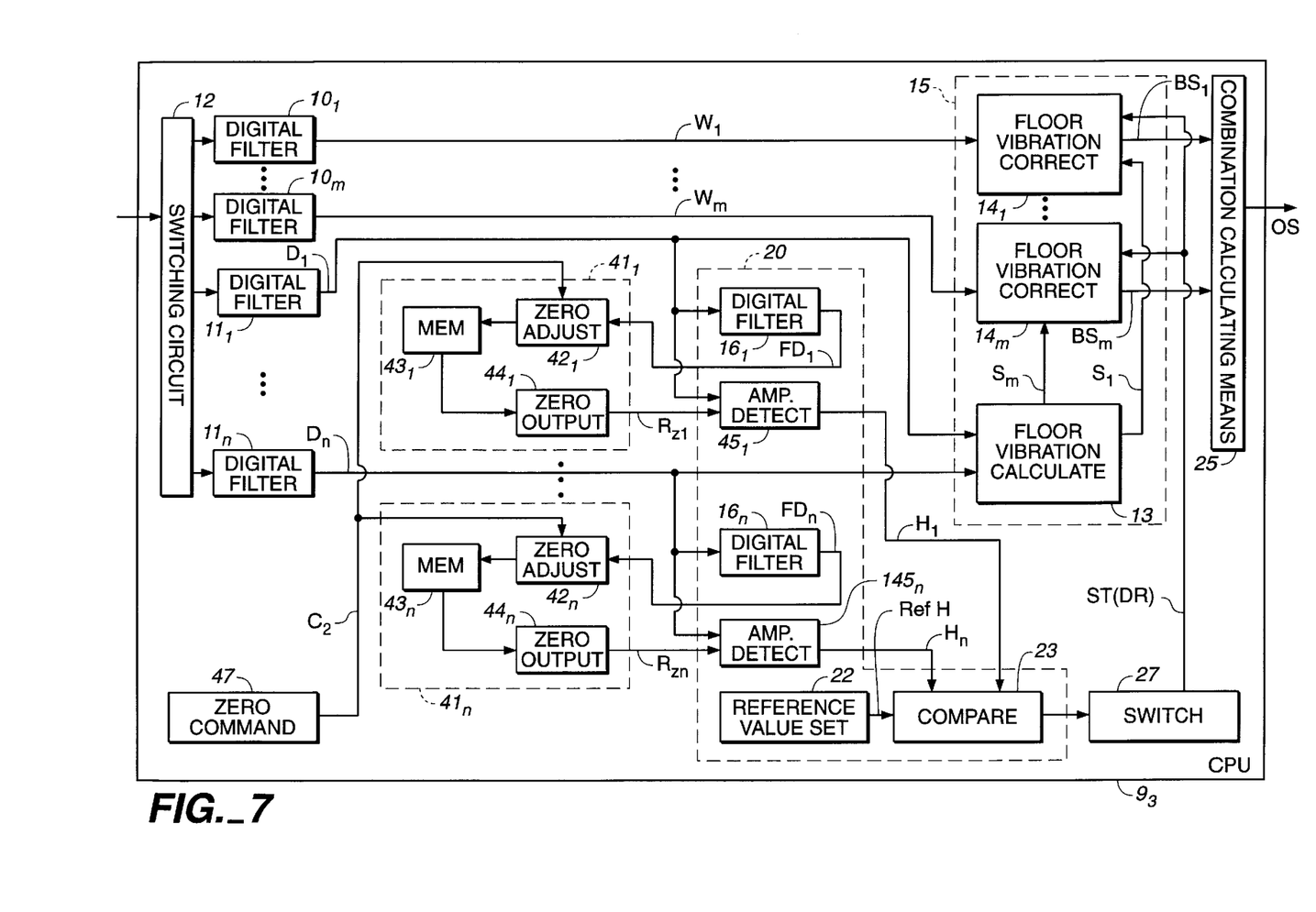

FIG. 7 shows still another CPU $9_3$ adapted to keep activated or deactivate the operations of its correction circuit 15, depending on the magnitudes of the amplitudes of the vibration-detecting signals $D_1$–$D_n$. As shown in FIG. 7, digital filters of the second kind $16_1$–$16_n$ are adapted to receive the vibration-detecting signals $D_1$–$D_n$, to remove therefrom the vibration components of the floor and to thereby output vibration corrected DC vibration-detecting signals $FD_1$–$FD_n$ to zero point adjusting means $42_1$–$42_n$ of zero point adjusting setting units $41_1$–$41_n$. These inputted signals $FD_1$–$FD_n$ are stored in memory devices (MEM) $43_1$–$43_n$ as zero points, and zero point signals $Rz_1$–$Rz_n$ indicative of the zero points are outputted from zero point outputting means $44_1$–$44_n$.

There is a zero point adjustment command means 47 adapted to output a command signal $C_2$ at a preset timing during a weighing operation, say, every 30 minutes. When the zero point adjusting means $42_1$–$42_n$ receive the command signal $C_2$, they accept the DC vibration-detecting signals $FD_1$–$FD_n$ for a predetermined length of time such as 10 seconds, thereby adjusting the zero points on the basis of these signals $FD_1$–$FD_n$, say, from their average values. If zero points are already known, a simple means for outputting a zero point may be used in place of the zero point adjusting setting units $41_1$–$41_n$.

The vibration-detecting signals $D_1$–$D_n$ are also inputted into amplitude detecting means $45_1$–$45_n$, which are adapted to detect the amplitudes $H_1$–$H_n$ of the vibration-detecting signals $D_1$–$D_n$ on the basis of the differences between the vibration-detecting signals $D_1$–$D_n$ and the zero point signals $Rz_1$–$Rz_n$ received from the zero point outputting means $44_1$–$44_n$. The amplitudes $H_1$–$H_n$ thus detected by the amplitude detecting means $45_1$–$45_n$ are received by a comparing means 23 and compared thereby with a reference amplitude value RefH set in a reference value setting means 22. The comparing means 23 outputs a stop signal ST to the correction circuit 15 if any of the detected amplitudes $H_1$–$H_n$ is smaller than the reference amplitude value RefH (minimum condition), if all of the detected amplitudes $H_1$–$H_n$ are smaller than the reference amplitude value RefH (maximum condition), or if the average of the detected amplitudes $H_1$–$H_n$ is smaller than the reference amplitude value RefH.

With the CPU $9_3$ thus formed, zero points can be stabilized by setting the zero-setting period to be long because the magnitudes of the amplitudes $H_1$–$H_n$ are evaluated by using the zero-point values stored in the memory devices $43_1$–$43_n$.

Figure 8:
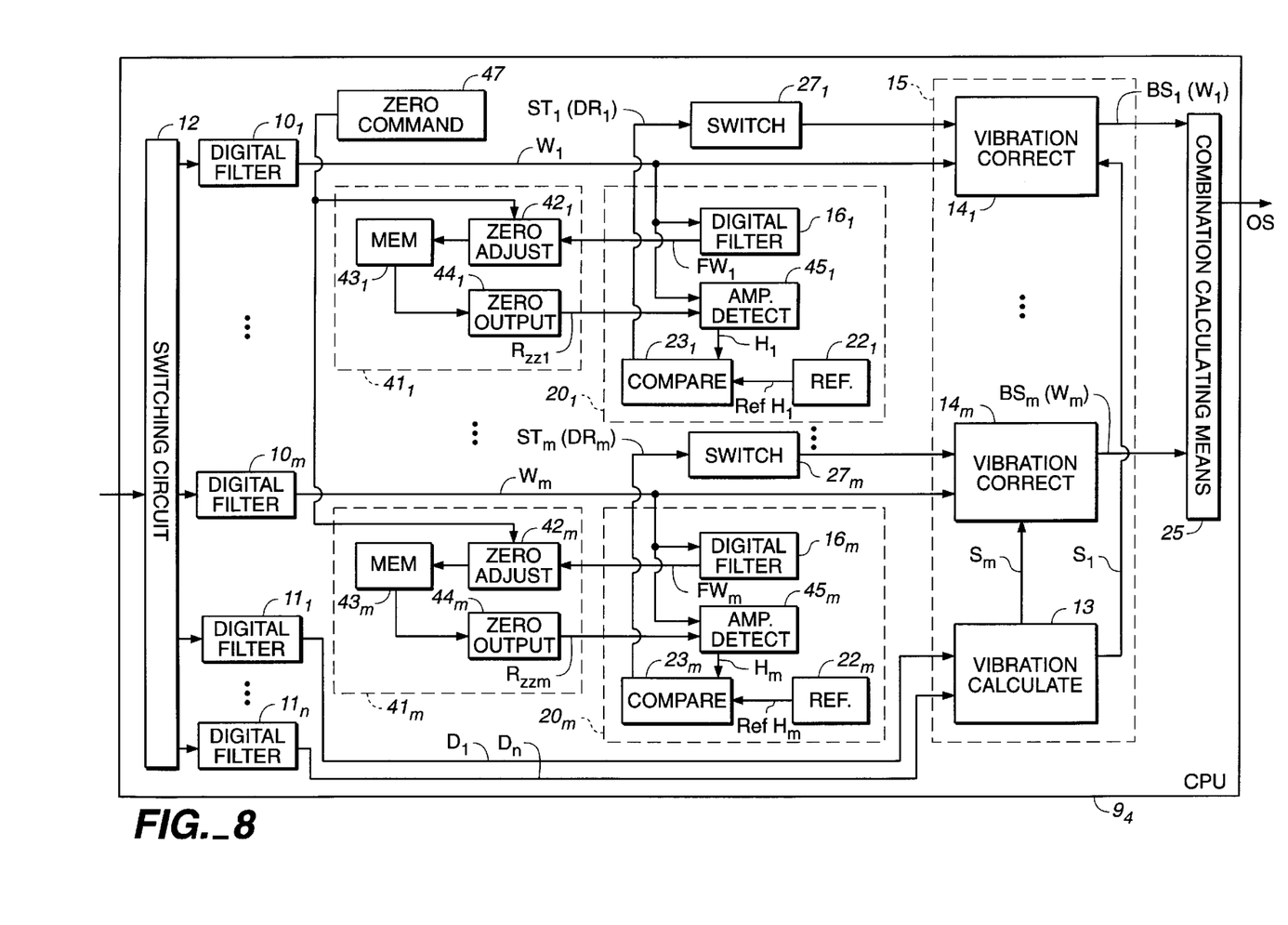

FIG. 8 shows still another CPU $9_4$ adapted to keep activating or deactivate the operations of its correction circuit 15, depending on the magnitudes of the amplitudes of the digital weight signals $W_1$–$W_m$ outputted from the scale cells $3_1$–$3_m$ (instead of the vibration-detecting signals $D_1$–$D_n$, as was the case with the CPU $9_3$ described above in FIG. 7), and provided with a plurality of correction control means $20_1$–$20_m$ corresponding individually to the m-number of load sensors $1_1$–$1_m$ (FIG. 1). There is a zero point adjustment command means 47 adapted to output a command signal $C_2$ at preset times when the scale cells $3_1$–$3_m$ are in unloaded conditions such as every morning before the daily weighing operation is started. When the command signal $C_2$ is received, zero point adjusting setting units $41_1$–$41_m$, individually corresponding to the load sensors $1_1$–$1_m$, are activated for a specified length of time, during which digital weight signals $W_1$–$W_m$, while the load sensors $1_1$–$1_m$ are in unloaded conditions, are passed through strong digital filters of the second kind $16_1$–$16_m$ and corrected DC weight signals $FW_1$–$FW_m$ are received by zero point adjusting means $42_1$–$42_n$. Zero points are thereby determined, say, from the average of these weight signals $W_1$–$W_m$, and stored in memory devices (MEM) $43_1$–$43_m$. Zero point outputting means $44_1$–$44_m$ serve to output zero point signals $Rzz_1$–$Rzz_m$ indicative of these zero points when weight signals $W_1$–$W_m$ are outputted subsequently when the load sensors $1_1$–$1_m$ are in loaded conditions. In situations where zero points are already known, a simple means for outputting a zero point may be used in place of zero point adjusting setting units $41_1$–$41_m$, as explained above with reference to FIG. 7.

Amplitude detecting means $45_1$–$45_m$ are adapted to detect the amplitudes $H_1$–$H_m$ of the weight signals $W_1$–$W_m$ on the basis of the differences between the weight signals $W_1$–$W_m$ under the no-load conditions and the zero point signals $Rzz_1$–$Rzz_m$ received from zero point outputting means $44_1$–$44_m$. The amplitudes $H_1$–$H_m$ thus detected by the amplitude detecting means $45_1$–$45_m$ are received by comparing means $23_1$–$23_m$ and compared thereby with reference amplitude values $RefH_1$–$RefH_m$ set in reference value setting means $22_1$–$22_m$. The comparison may be made in terms of maximums, minimums or averages, as explained above. It may be noted that the same reference value may be used for the m-number of amplitudes $H_1$–$H_m$ in some situations and that there may be situations where less than all of the comparing means $23_1$–$23_m$ output a stop signal such that some of the weight signals $W_1$–$W_m$ are vibration-corrected while some are not.

Throughout herein, it is to be understood that only representative embodiments are being described. Many of the features explained with reference to one of the described embodiments can be incorporated equally well in another embodiment shown herein. In the CPU $9_3$ shown in FIG. 7, for example, a plurality of correction control means corresponding individually to the n-number of vibration-detecting cells $4_1$–$4_n$ may be provided as shown in FIG. 8. In the CPU $9_4$ shown in FIG. 8, as another example, a single correction control means may be provided in common for all load sensors $1_1$–$1_m$ (FIG. 1). Although the correction circuit 15, in all of the embodiments described above, is controlled by correction control means 20 for detecting vibration components contained in weight signals $W_1$–$W_m$ or vibration-detecting signals $D_1$–$D_n$, displacement signals $S_1$–$S_m$, calculated by the floor vibration calculating means 13 and representing the vertical motion of the floor, may be used to determine whether floor vibration corrections are necessary or not, as shown in FIG. 9.

Figure 9:
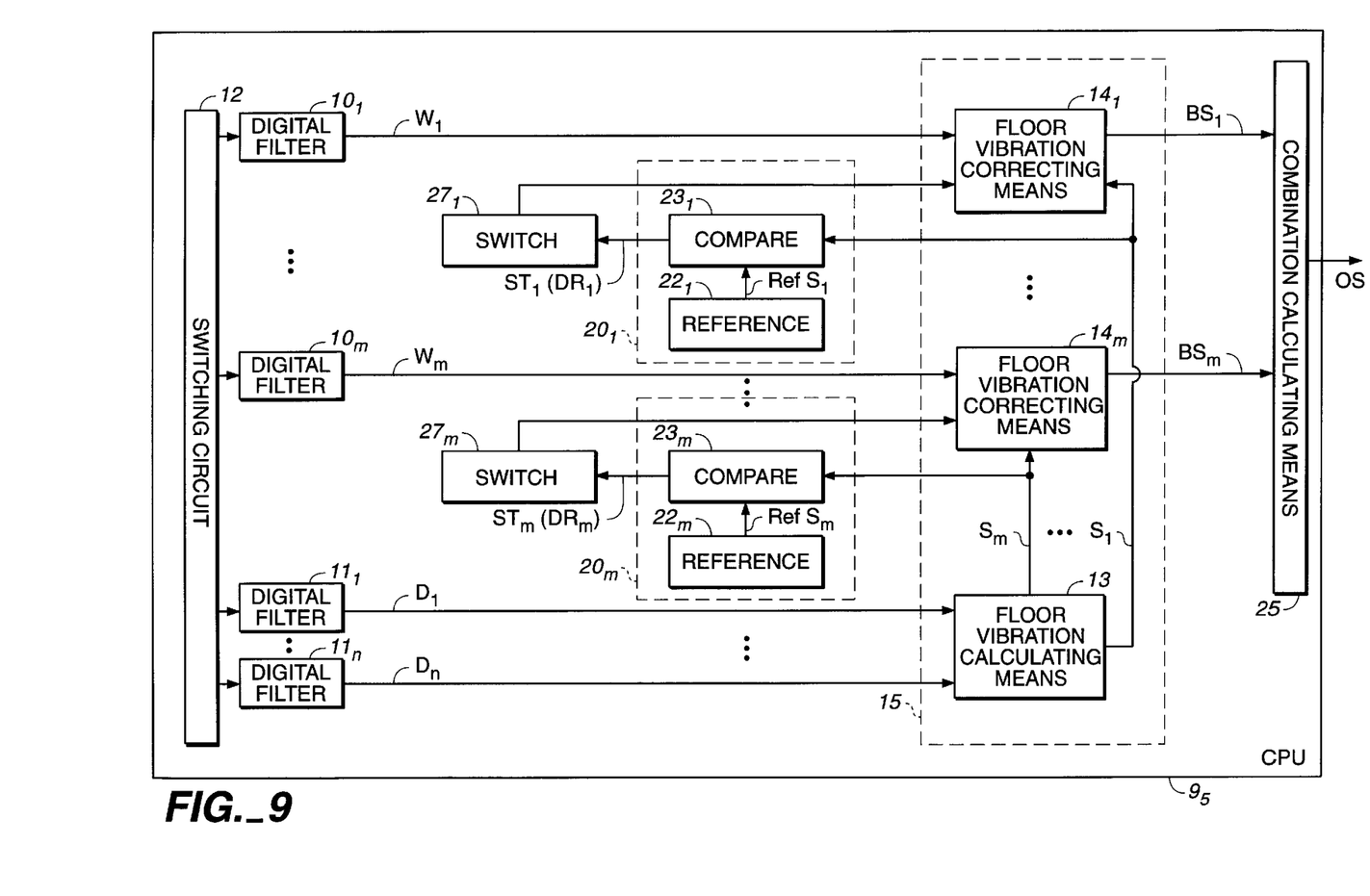

FIG. 9 shows such a CPU $9_5$, including a floor vibration calculating means 13 adapted to calculate the vibration mode of the floor from the vibration components of the vibration-detecting signals $D_1$–$D_n$ and to output displacement signals $S_1$–$S_m$ indicative of the vertical displacements of the floor at the positions of the scale cells $3_1$–$3_m$. The CPU $9_5$ also includes m-number of comparing means $23_1$–$23_m$ corresponding to the m-number of scale cells $3_1$–$3_m$. These comparing means $23_1$–$23_m$ are adapted to receive the displacement signals $S_1$–$S_m$ outputted from the floor vibration calculating means 13 and to compare them with reference values $RefS_1$–$RefS_m$ stored in reference value setting means $22_1$–$22_m$, outputting stop signals $ST_1$–$ST_m$ to the floor vibration correcting means $14_1$–$14_m$ if the level of the displacement signals $S_1$–$S_m$ is lower than that of the reference values $RefS_1$–$RefS_m$ and drive signals $DR_1$–$DR_m$ if otherwise.

With the CPU $9_5$ thus formed, the floor vibration calculating means 13 can calculate the effects of floor vibrations on the scale cells $3_1$–$3_m$ accurately even where the vibration-detecting signals $D_1$–$D_n$ outputted from the vibration-detecting cells $4_1$–$4_n$ do not accurately represent the effects of the floor vibrations on the scale cells $3_1$–$3_m$ because, for example, the scale and vibration-detecting cells $3_1$–$3_m$, $4_1$–$4_n$ are positioned differently. In other words, the CPU $9_5$ as shown in FIG. 9 can activate or deactivate the correction circuit 15 more appropriately according to the motion of the individual scale cells $3_1$–$3_m$.

Figure 10:
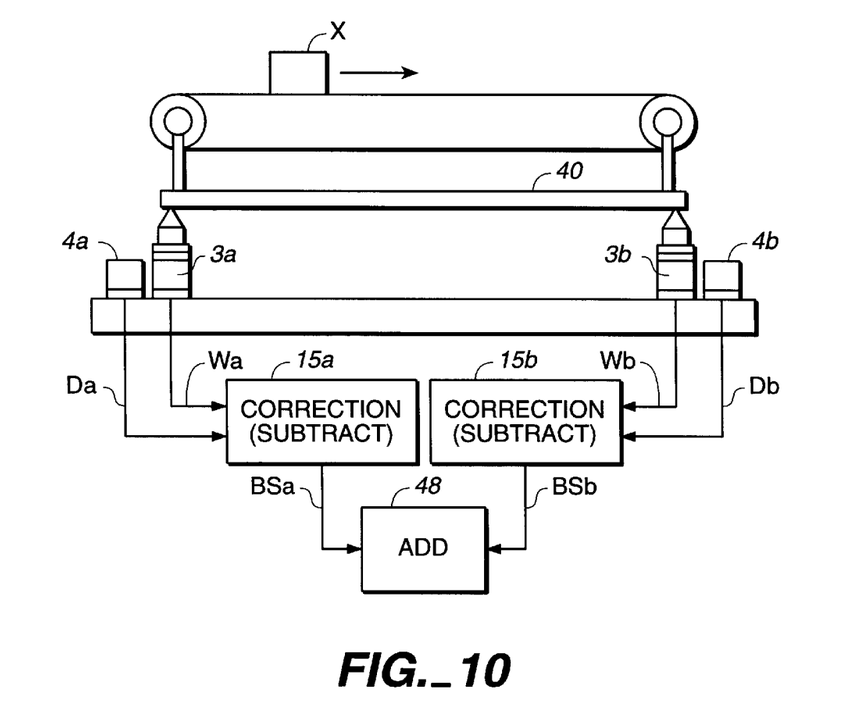
FIG. 10 is a schematic structural diagram of a multi-point cell type weighing machine embodying the invention.

The present invention can be applied also to weighing machines of the multi-point cell type shown, for example, in FIG. 10, adapted to weigh a single object X by using a plurality (two shown in FIG. 10) of scale cells $3a$ and $3b$. According to the example shown in FIG. 10. a pair of scale cells $3a$ and $3b$ is disposed at two end positions of a weighing table 40, and vibration-detecting cells $4a$ and $4b$ are positioned such that each of them is close to one of the scale cells $3a$ and $3b$. Throughout herein, for convenience, two cells will be said to be positioned close to each other if they are so close to each other that they will experience and hence detect the same mode of floor vibration. Correction circuits $15a$ and $15b$ are provided to respectively remove the effects of the floor vibration detected by the vibration-detecting cells $4a$ and $4b$ represented by vibration-detecting signals $D_a$ and $D_b$ from the weight signals $W_a$ and $W_b$ outputted from the scale cells $3a$ and $3b$. If each pair of the scale and vibration-detecting cells $3a$ with $4a$ and $3b$ with $4b$ is close to each other in the sense defined above, each of the correction circuits $15a$ and $15b$ may comprise a simple subtracting circuit. The outputs $BS_a$ and $BS_b$ from these two correction circuits $15a$ and $15b$ are added by an adding circuit 48 to thereby obtain a corrected weight value of the weighed object X. Although not indicated in FIG. 10, the correction circuits $15a$ and $15b$ are adapted to output the weight signals $W_a$ and $W_b$ directly (as output signals $BS_a$ and $BS_b$) if the amplitude of the floor vibration as represented by the vibration-detecting signals $D_a$ and $D_b$ are smaller than a certain reference value. It now goes without saying that the correction circuits $15a$ and $15b$ of FIG. 10 need not comprise a simple subtracting circuit but may function as explained above with reference to FIGS. 2 and 5–9. Although not separately illustrated, furthermore, a single vibration-detecting cell may be placed between the pair of scale cells $3a$ and $3b$ and the vibration component of the output from this single vibration-detecting cell may be subtracted from the sum of the weight signals Wa and Wb. It also goes without saying that the present invention also applies to weighing machines of a single-cell type having only one scale cell.

In summary, this invention makes it possible not only to correct weight signals by subtracting the effects of floor vibration therefrom but also not to perform such correction if the amplitudes of the floor vibrations are less than a certain reference value so as to eliminate the possibility of incurring a large error by attempting to correct errors due to difference in sensitivity between the scale and vibration-detecting cells, quantization errors when analog-to-digital conversion is carried out, and weighing errors due to rounding off.

The disclosure is intended to be interpreted broadly. The basic principles of the invention can be applied to many more different kinds of weighing machines than illustrated herein. For example, the features of the present invention can be incorporated into all kinds of weighing machines and their control systems disclosed in U.S. patent application Ser. No. 08/233,585 filed Apr. 26, 1994. In particular, it is to be noted that what is herein referred to as the "vibration-detecting cells" need not be so-called dummy cells which are not adapted to weigh any object but are installed exclusively for the purpose of detecting the mode of floor vibration.

Instead, if the weighing machine is a combinational weighing machine of the type not with many scale cells, what is herein referred to as the "vibration-detecting cells" may be merely those of the scale cells which were not selected in the preceding cycle of combinational calculation. In short, all modifications and variations of the disclosed embodiments that may be apparent to persons skilled in the art are intended to be within the scope of the invention.

What is claimed is:

1. A weighing machine comprising:
   a scale cell for weighing an object and outputting a weight signal indicative of measured weight value of said object;
   a vibration-detecting cell set on the same floor as said scale cell for outputting a floor vibration signal indicative of the vibration of said floor;
   correcting means for correcting said weight signal on the basis of said floor vibration signal outputted from said vibration-detecting cell and thereby generating vibration corrected signal indicative of corrected weight value of said object not containing effects of said vibration of said floor;
   correction control means for detecting vibration components of said floor and selectively deactivating or not deactivating said correcting means, depending on the result of comparison between said vibration components and a predefined reference value;
   first peak detecting means for detecting peaks in said weight signal from said scale cell; and
   second peak detecting means for detecting peaks in a vibration-corrected signal outputted from said correcting means;
   said correction control means including peak comparing means for using a peak detected by said second peak detecting means as said reference value and comparing a peak detected by said first peak detecting means with said reference value.

2. The weighing machine of claim 1 wherein said correction control means includes:
   a filter which is connected to said scale cell in parallel with said correcting means and passes said weight signal from said scale cell therethrough; and
   vibration component detecting means for comparing said weight signal before and after passing through said filter and thereby detecting vibration components of said floor;
   said weighing machine further comprising command means for causing a comparison to be made between said vibration components and said reference value only during a preset comparison time interval.

3. The weighing machine of claim 1 wherein said correction control means includes:
   a filter which is connected to said vibration-detecting cell in parallel with said correcting means and passes said floor vibration signal from said vibration-detecting cell therethrough; and
   vibration component detecting means for comparing said floor vibration signal before and after passing through said filter and thereby detecting vibration components of said floor;
   said weighing machine further comprising command means for causing a comparison to be made between said vibration components and said reference value only during a preset comparison time interval.

4. The weighing machine of claim 1 wherein said correction control means includes:
   zero-point adjusting means operating during a specified zero-point adjusting time interval for storing a zero-point level indicated by a zero-point signal obtained by removing said vibration components from said weight signal and thereby outputting a zero-point signal indicative of said zero-point level; and
   amplitude detecting means for detecting the amplitude of said floor vibration signal from the difference between said floor vibration signal and said zero-point signal.

5. The weighing machine of claim 1 wherein said correction control means includes:
   zero-point adjusting means operating during a specified zero-point adjusting time interval for storing a zero-point level indicated by a zero-point signal obtained by removing said vibration components from a no-load weight signal outputted from said scale cell under a no-load condition and thereby outputting a zero-point signal indicative of said zero-point level; and
   amplitude detecting means for detecting the amplitude of said no-load weight signal from the difference between said no-load weight signal and said zero-point signal.

6. The weighing machine of claim 1 wherein said scale cell and said vibration-detecting cell are disposed close to each other so as to receive substantially the same effects of vibrations from said floor, said correction means comprising subtractor means for subtracting vibration component of said floor vibration signal from said weight signal.

7. A vibration correcting system for a weighing machine which outputs a weight signal indicative of measured weight of an object and a floor vibration signal indicative of the floor vibrations affecting said weight signal, said system comprising:
   correcting means for correcting said weight signal on the basis of said floor vibration signal outputted from said vibration-detecting cell and thereby generating vibration corrected signal indicative of corrected weight value of said object not containing effects of said vibration of said floor;
   correction control means for detecting vibration components of said floor and selectively deactivating or not deactivating said correcting means, depending on the result of comparison between said vibration components and a predefined reference value;
   first peak detecting means for detecting peaks in said weight signal; and
   second peak detecting means for detecting peaks in a vibration-corrected signal outputted from said correcting means;
   said correction control means including peak comparing means for using a peak detected by said second peak detecting means as said reference value and comparing a peak detected by said first peak detecting means with said reference value.

8. The vibration correcting system of claim 7 wherein said correction control means includes:

a filter which passes said weight signal therethrough; and vibration component detecting means for comparing said weight signal before and after passing through said filter and thereby detecting vibration components of said floor;

said system further comprising command means for causing a comparison to be made between said vibration components and said reference value only during a preset comparison time interval.

9. The vibration correcting system of claim 7 wherein said correction control means includes:

a filter which passes said floor vibration signal therethrough; and vibration component detecting means for comparing said floor vibration signal before and after passing through said filter and thereby detecting vibration components of said floor;

said weighing machine further comprising command means for causing a comparison to be made between said vibration components and said reference value only during a preset comparison time interval.

10. The vibration correcting system of claim 7 wherein said correction control means includes:

zero-point adjusting means operating during a specified zero-point adjusting time interval for storing a zero-point level indicated by a zero-point signal obtained by removing said vibration components from said weight signal and thereby outputting a zero-point signal indicative of said zero-point level; and amplitude detecting means for detecting the amplitude of said floor vibration signal from the difference between said floor vibration signal and said zero-point signal.

11. The vibration correcting system of claim 7 wherein said correction control means includes:

zero-point adjusting means operating during a specified zero-point adjusting time interval for storing a zero-point level indicated by a zero-point signal obtained by removing said vibration components from a no-load weight signal outputted from said weighing machine under a no-load condition and thereby outputting a zero-point signal indicative of said zero-point level; and amplitude detecting means for detecting the amplitude of said no-load weight signal from the difference between said no-load weight signal and said zero-point signal.

12. A weighing machine comprising:

scale cells each for weighing an object and outputting as weight signal indicative of measured weight value of said object;

vibration-detecting cells set on the same floor as said scale cells for outputting floor vibration signals indicative of the vibration of said floor;

correcting means for correcting said weight signals on the basis of said floor vibration signals outputted from said vibration-detecting cells and thereby generating vibration corrected signals indicative of corrected weight values of said objects not containing effects of the vibration of said floor; and correction control means for detecting vibration components of said floor, activating said correcting means if the vibration components are greater than a predefined reference value and deactivating said correcting means if the vibration components are not greater than said predefined reference.

13. The weighing machine of claim 12 wherein said correcting means include:

vibration calculating means for detecting vibration modes of the plane of said floor from vibration components of floor vibration signals outputted from said plural number of vibration-detecting cells and calculating vertical displacements of said floor from the detected vibration modes of said floor at the positions of said scale cells; and vibration correcting means for generating a vibration-corrected signal by removing said vibration components from said weight signal by using said vertical displacements.

14. The weighing machine of claim 13 further comprising a combination-calculating means for calculating combinations of weight signals outputted from said plurality of scale cells and selecting a combination of said plurality of scale cells according to a predefined criterion for each cycle of operations of said weighing machine, said vibration-detecting cells being selected from said scale cells not selected in the preceding cycle of operations of said weighing machine.

15. The weighing machine of claim 13 wherein said correction control means includes comparing means for comparing said vertical displacement calculated by said vibration calculating means with said reference value.

16. The weighing machine of claim 12 further comprising a combination-calculating means for calculating combinations of weight signals outputted from said plurality of scale cells and selecting a combination of said plurality of scale cells according to a predefined criterion for each cycle of operations of said weighing machine, said vibration-detecting cells being selected from said scale cells not selected in the preceding cycle of operations of said weighing machine.

* * * * *